(12) United States Patent
Sobanski et al.

(10) Patent No.: US 11,536,147 B2
(45) Date of Patent: Dec. 27, 2022

(54) VANE ARC SEGMENT WITH FLANGE AND GUSSET

(71) Applicant: RAYTHEON TECHNOLOGIES CORPORATION, Farmington, CT (US)

(72) Inventors: Jon E. Sobanski, Glastonbury, CT (US); Bryan P. Dube, Columbia, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/216,973

(22) Filed: Mar. 30, 2021

(65) Prior Publication Data

US 2022/0316350 A1    Oct. 6, 2022

(51) Int. Cl.
*F01D 9/04* (2006.01)
*F01D 11/00* (2006.01)

(52) U.S. Cl.
CPC ............ *F01D 9/041* (2013.01); *F01D 11/005* (2013.01); *F05D 2220/323* (2013.01); *F05D 2240/80* (2013.01); *F05D 2300/6033* (2013.01)

(58) Field of Classification Search
CPC . F01D 11/005; F01D 9/00; F01D 9/02; F01D 9/04; F01D 9/041; F01D 9/042; F01D 5/12; F01D 5/14; F01D 5/28; F01D 5/282; F01D 5/284; F05D 2240/80; F05D 2300/6033; F05D 2220/323
See application file for complete search history.

(56) References Cited

U.S. PATENT DOCUMENTS

| 5,813,832 A | * | 9/1998 | Rasch | F01D 5/005 415/200 |
| 7,008,185 B2 | * | 3/2006 | Peterman | F01D 5/189 415/115 |

(Continued)

FOREIGN PATENT DOCUMENTS

| CA | 2260179 | 9/2009 |
| JP | 2004257389 | 9/2004 |
| WO | 2005008032 | 1/2005 |

OTHER PUBLICATIONS

European Search Report for European Patent Application No. 22165664.8 dated Jun. 28, 2022.

*Primary Examiner* — Eldon T Brockman
*Assistant Examiner* — Elton K Wong
(74) *Attorney, Agent, or Firm* — Carlson, Gaskey & Olds, P.C.

(57) ABSTRACT

A vane arc segment includes an airfoil fairing that has first and second fairing platforms and an airfoil section therebetween. The airfoil section has a pressure side, a suction side, and an internal cavity. The first fairing platform defines suction and pressure side circumferential mate faces, forward and aft faces, a gaspath side, a non-gaspath side, and a flange that projects from the non-gaspath side. The flange extends along one of the suction or pressure side circumferential mate faces. There is a rib that has a rib section in the internal cavity that spans the pressure and suction sides and a rib extension section that extends from the rib section in the internal cavity and along the non-gaspath side of the first fairing platform. The rib extension intersects the flange to form a gusset for reinforcing the flange.

17 Claims, 5 Drawing Sheets

(56) References Cited

U.S. PATENT DOCUMENTS

| | | | |
|---|---|---|---|
| 9,500,088 B2 | 11/2016 | Schlemmer et al. | |
| 10,428,668 B2 | 10/2019 | Schlemmer et al. | |
| 2009/0092485 A1* | 4/2009 | Bridges, Jr. | F01D 11/005 |
| | | | 29/888.3 |
| 2012/0301313 A1* | 11/2012 | Suciu | F01D 25/246 |
| | | | 156/185 |
| 2014/0248140 A1* | 9/2014 | Jacques | F01D 5/3038 |
| | | | 415/183 |
| 2015/0174707 A1* | 6/2015 | Li | B23K 1/00 |
| | | | 427/142 |
| 2018/0223680 A1 | 8/2018 | Hafner | |
| 2019/0040751 A1* | 2/2019 | Zemitis | F01D 9/041 |

* cited by examiner

VANE ARC SEGMENT WITH FLANGE AND GUSSET

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A vane arc segment according to an example of the present disclosure includes an airfoil fairing that has first and second fairing platforms and an airfoil section that extends there between. The airfoil section has a pressure side, a suction side, and an internal cavity. The first fairing platform defines suction and pressure side circumferential mate faces, forward and aft faces, a gaspath side, a non-gaspath side, and a flange that projects from the non-gaspath side. The flange extends along one of the suction or pressure side circumferential mate faces. A rib has a rib section in the internal cavity spanning the pressure side and the suction side and a rib extension section extending from the rib section in the internal cavity and along the non-gaspath side of the first fairing platform. The rib extension intersects the flange to form a gusset for reinforcing the flange.

In a further embodiment of any of the foregoing embodiments, the rib extension is substantially perpendicular to the flange.

In a further embodiment of any of the foregoing embodiments, the flange extends along the suction side circumferential mate face and the rib extension terminates at a fillet between the pressure side of the airfoil section and the first fairing platform.

In a further embodiment of any of the foregoing embodiments, relative to the non-gaspath side, the rib extension defines a rib extension height, the flange defines a flange height, and the flange height is approximately equal than the rib extension height.

In a further embodiment of any of the foregoing embodiments, the rib extension defines a rib extension through-thickness, the flange defines a flange through-thickness, and the rib extension through-thickness is less than the flange through-thickness.

In a further embodiment of any of the foregoing embodiments, the flange extends along the suction side circumferential mate face and the first fairing platform includes a seal flange that projects from the non-gaspath side and overhangs the pressure side circumferential mate face.

In a further embodiment of any of the foregoing embodiments, the seal flange includes a radial bearing face.

In a further embodiment of any of the foregoing embodiments, the airfoil fairing is arranged about gas turbine engine central axis, and the suction and pressure side circumferential mate faces form angles of 15° to 60° relative to the gas turbine engine central axis.

In a further embodiment of any of the foregoing embodiments, the airfoil fairing is formed of a ceramic matrix composite that has a plurality of fiber plies that are continuous through the flange and first fairing platform, the airfoil section, and the second fairing platform.

In a further embodiment of any of the foregoing embodiments, the flange bears radial, tangential, and axial aerodynamic load transmissions of the airfoil fairing.

In a further embodiment of any of the foregoing embodiments, the flange is flush with the one of the suction or pressure side circumferential mate faces along which the flange extends.

In a further embodiment of any of the foregoing embodiments, the flange is offset from the one of the suction or pressure side circumferential mate faces along which the flange extends.

In a further embodiment of any of the foregoing embodiments, the airfoil fairing is arranged about gas turbine engine central axis, the flange includes a radial face that has a curved profile, and the curved profile is a cylindrical surface segment of a reference cylinder having a main axis that is co-linear with the gas turbine engine central axis.

A gas turbine engine according to an example of the present disclosure includes a compressor section, a combustor in fluid communication with the compressor section, and a turbine section in fluid communication with the combustor. The turbine section has vane arc segments disposed about a central axis of the gas turbine engine. Each of the vane arc segments includes an airfoil fairing having first and second fairing platforms and an airfoil section extending there between. The airfoil section has a pressure side, a suction side, and an internal cavity. The first fairing platform defines suction and pressure side circumferential mate faces, forward and aft faces, a gaspath side, a non-gaspath side, and a flange that projects from the non-gaspath side. The flange extends along one of the suction or pressure side circumferential mate faces. A rib has a rib section in the internal cavity spanning the pressure side and the suction side and a rib extension section extending from the rib section in the internal cavity and along the non-gaspath side of the first fairing platform. The rib extension intersects the flange to form a gusset for reinforcing the flange.

In a further embodiment of any of the foregoing embodiments, the flange extends along the suction side circumferential mate face and the first fairing platform includes a seal flange that projects from the non-gaspath side and overhangs the pressure side circumferential mate face the seal flange.

In a further embodiment of any of the foregoing embodiments, the flange includes a radial flange face and the seal flange includes a radial bearing face, and the radial flange face of a first one of the vane arc segments seal against the radial bearing face of a second, adjacent one of the vane arc segments.

A vane system according to an example of the present disclosure includes a plurality of vane arc segments. Each said vane arc segment includes an airfoil fairing that has first and second fairing platforms and an airfoil section extending there between. The airfoil section has a pressure side and a suction side. The first fairing platform defines suction and pressure side circumferential mate faces, forward and aft faces, a gaspath side, a non-gaspath side, and a first flange that projects from the non-gaspath side. The first flange extends along the suction side circumferential mate face and including a radial flange face. A second flange that projects from the non-gaspath side and overhangs the pressure side circumferential mate face. The second flange includes a radial bearing face, wherein and the radial flange face of a first one of the vane arc segments seals against the radial bearing face of a second, adjacent one of the vane arc segments.

In a further embodiment of any of the foregoing embodiments, the airfoil section defines an internal cavity and includes a rib that has a rib section in the internal cavity spanning the pressure side and the suction side and a rib extension section that extends from the rib section in the internal cavity and along the non-gaspath side of the first fairing platform. The rib extension intersects the flange to form a gusset for reinforcing the flange.

In a further embodiment of any of the foregoing embodiments, the rib extension terminates at a fillet between the pressure side of the airfoil section and the first fairing platform.

In a further embodiment of any of the foregoing embodiments, the rib extension defines a rib extension through-thickness, the first flange defines a flange through-thickness, and the flange through-thickness is greater than the rib extension through-thickness.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
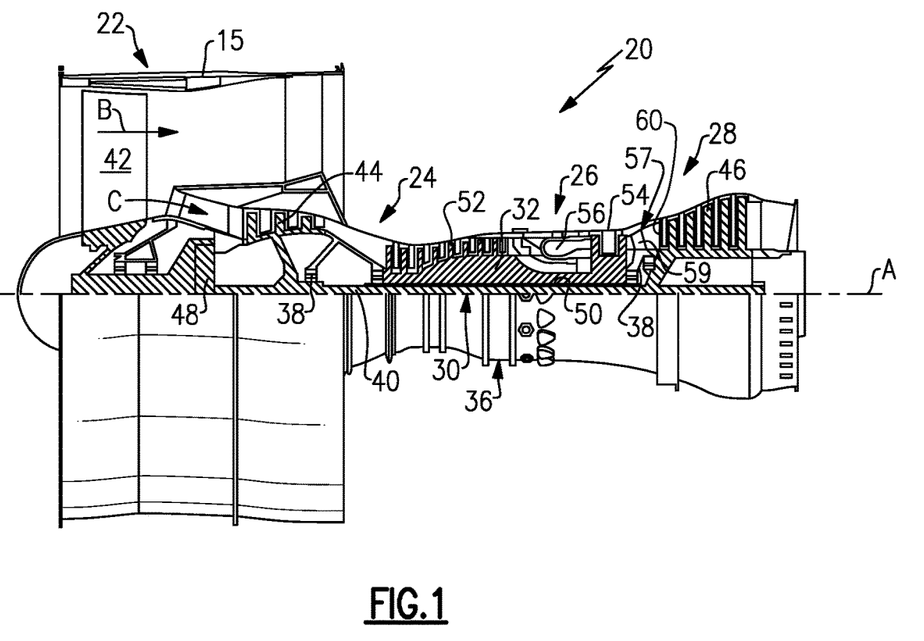
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2A:
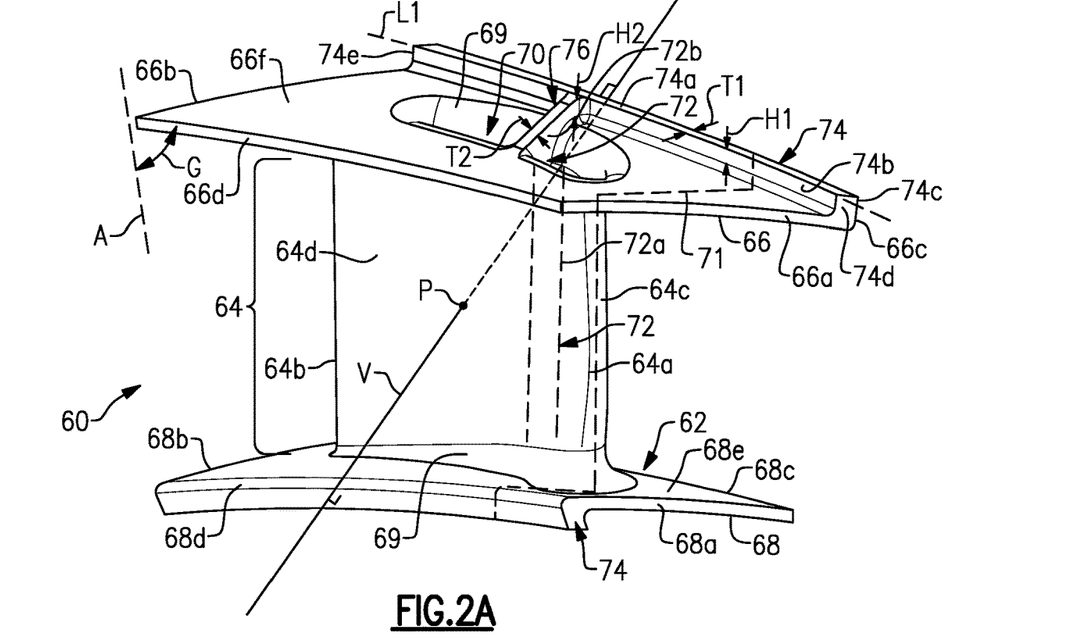
FIG. 2A illustrates an airfoil fairing of the engine.
Figure 2B:
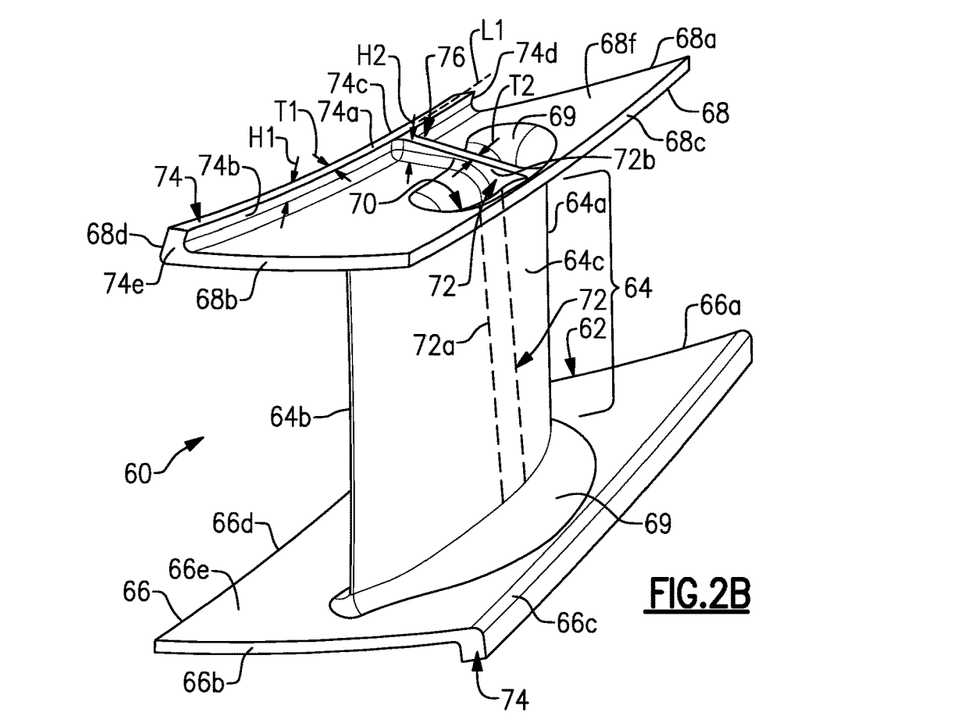
FIG. 2B illustrates another view of the airfoil fairing.

FIGS. 2A and 2B illustrate different angled views of portions of a vane arc segment 60, namely airfoil fairing 62, from the turbine section 28 of the engine 20. A plurality of such vane arc segments 60 is situated in a circumferential row about the engine central axis A. Although the vane arc segment 60 is shown and described with reference to application in the turbine section 28, it is to be understood that the examples herein are also applicable to structural vanes in other sections of the engine 20.

The vane arc segment 60 is comprised of at least the airfoil fairing 62. The airfoil fairing 62 includes several sections, including an airfoil section 64 and first and second platforms 66/68 between which the airfoil section 64 extends. Fillets 69 provide a transition from the airfoil section 64 to the platforms 66/68. The airfoil section 64 defines forward and trailing edges 64a/64b and suction and pressure sides 64c/64d. The airfoil section 64 circumscribes an internal cavity 70. A rib 72 divides the cavity 70 into forward and aft sub-cavities. The rib 72 will be described in additional detail further below.

The airfoil fairing 62 is continuous in that the platforms 66/68 and airfoil section 64 constitute a unitary body. As an example, the airfoil fairing 62 is formed of a ceramic matrix composite, an organic matrix composite (OMC), or a metal matrix composite (MMC). For instance, the ceramic matrix composite (CMC) is formed of ceramic fiber tows that are disposed in a ceramic matrix. The ceramic matrix composite may be, but is not limited to, a SiC/SiC ceramic matrix composite in which SiC fiber tows are disposed within a SiC matrix. Example organic matrix composites include, but are not limited to, glass fiber tows, carbon fiber tows, and/or aramid fiber tows disposed in a polymer matrix, such as epoxy. Example metal matrix composites include, but are not limited to, boron carbide fiber tows and/or alumina fiber tows disposed in a metal matrix, such as aluminum. A fiber tow is a bundle of filaments. As an example, a single tow may have several thousand filaments. The tows may be arranged in a fiber architecture, which refers to an ordered arrangement of the tows relative to one another, such as, but not limited to, a 2D woven ply or a 3D structure. In the airfoil fairing 62 one or more fiber plies 71 are continuous through the platform 66, including the flange 74, the airfoil section 64, and the platform 68, including the flange 74.

In the illustrated example, the first platform 66 is a radially outer platform and the second platform 68 is a radially inner platform. The first platform 66 defines forward and aft (axial) sides 66a/66b, suction and pressure side circumferential mate faces 66c/66d, a gaspath side 66e, and a non-gaspath side 66f. The gaspath and non-gaspath sides 66e/66f are made with reference to the core gaspath C of the engine 20. Likewise, the second platform 68 defines forward and aft (axial) sides 68a/68b, suction and pressure side circumferential mate faces 68c/68d, a gaspath side 68e, and a non-gaspath side 68f. For reasons that will be explained further below, the suction and pressure side circumferential mate faces 66c/66d/68c/68d each form an angle G of 15° to 60° relative to the gas turbine engine central axis A. Terms such as "inner" and "outer" used herein refer to location with respect to the central engine axis A, i.e., radially inner or radially outer. Moreover, the terminology "first" and "second" used herein is to differentiate that there are two architecturally distinct components or features. It is to be further understood that the terms "first" and "second" are interchangeable in that a first component or feature could alternatively be termed as the second component or feature, and vice versa.

Each of the platforms 66/68 in the illustrated example includes a flange 74 that projects radially from the respective non-gaspath side 66f/68f. In the illustrated example, the flange 74 of the platform 66 runs along the suction side circumferential mate face 66c, and the flange 74 of the platform 68 runs along the pressure side circumferential mate face 68d. For example, as shown, the flanges 74 are flush with the respective mate faces 66c/68d. Each flange 74 defines a radial face 74a, first and second tangential/axial faces 74b/74c, and end faces 74d/74e. Since the mate faces 66c/66d/68c/68d are angled, the faces 74b/74c have both tangential and axial components and are thus termed "tangential/axial faces 74b/74c."

The radial faces 74a may have planar profile or a curved profile. In the illustrated example, the radial faces 74a have a curved profile, to facilitate load transmission. For example, the curved profile is that of a cylindrical surface segment. A cylindrical surface segment is a surface, here the radial face 74a, that has the shape of a section of a surface of a cylinder. For example, the cylindrical surface segment is that of a reference cylinder that has its main axis parallel to the central engine axis A. For instance, the main axis of the reference cylinder is co-linear with the central engine axis A.

The flanges 74 are generally elongated in respective length-wise directions L1 between the forward sides 66a/68a and the aft sides 66b/68b of the platforms 66/68 and define respective flange heights H1 (from the non-gaspath sides 66f/68f to the radial faces 74a) and flange through-thicknesses T1 (between faces 74b/74c). As shown, the flanges 74 extend all the way to the forward sides 66a/68a and the aft sides 66b/68b such that end faces 74d/74e are flush with the sides 66a/68a and sides 66b/68b, however, the flanges 74 could alternatively terminate short of the forward sides 66a/68a and/or the aft sides 66b/68b to provide space for seals or other hardware. If stopping short, the flanges 74 extend at least over a majority of the length of the platforms 66/68 between the forward sides 66a/68a and the aft sides 66b/68b, such as at least 80% or at least 90% of the length.

Turning again to the rib 72, the rib includes a rib section 72a in the internal cavity 70. The rib section 72a spans the pressure and suction sides 64c/64d of the airfoil section 64. The rib section 72a serves to reinforce the pressure and suction sides 64c/64d and segregate the forward and aft sub-cavities. The rib 72 further includes at least one rib extension section 72b that extends from the rib section 72a in the internal cavity 70. Although the rib section 72a and the rib extension 72b are discussed as individual features, it is to be understood that the rib 72 is continuous and that these sections refer to portions of the rib 72 that serve different functions. In the illustrated example, the rib 72 has rib extensions 72b at both the radially outer end (at platform 66) and radially inner end (at platform 68). As will be appreciated, this example is to demonstrate one potential implementation and in other examples the rib extension 72b may be used at only one of the radial ends (at either platform 66 or platform 68).

The rib extensions 72b extend along the non-gaspath sides 66f/68f and intersect the flanges 74 to form gussets 76 for reinforcing the flanges 74. Each rib extension 72b defines a rib extension height H2 (from the non-gaspath sides 66f/68f) and a rib extension through-thickness T2. In this example, the rib extensions 72b terminate at the fillets 69 between the airfoil section 64 and the platforms 66/68. Accordingly, the rib extension 72b at the outer radial end at platform 66 terminates at the fillet 69 between the pressure side 64d and the platform 66, and the rib extension 72b at the inner radial end at platform 68 terminates at the fillet 69 between the suction side 64c and the platform 68. That is, the rib extensions 72b do not extend all the way across the respective platforms 66/68.

Figure 3:
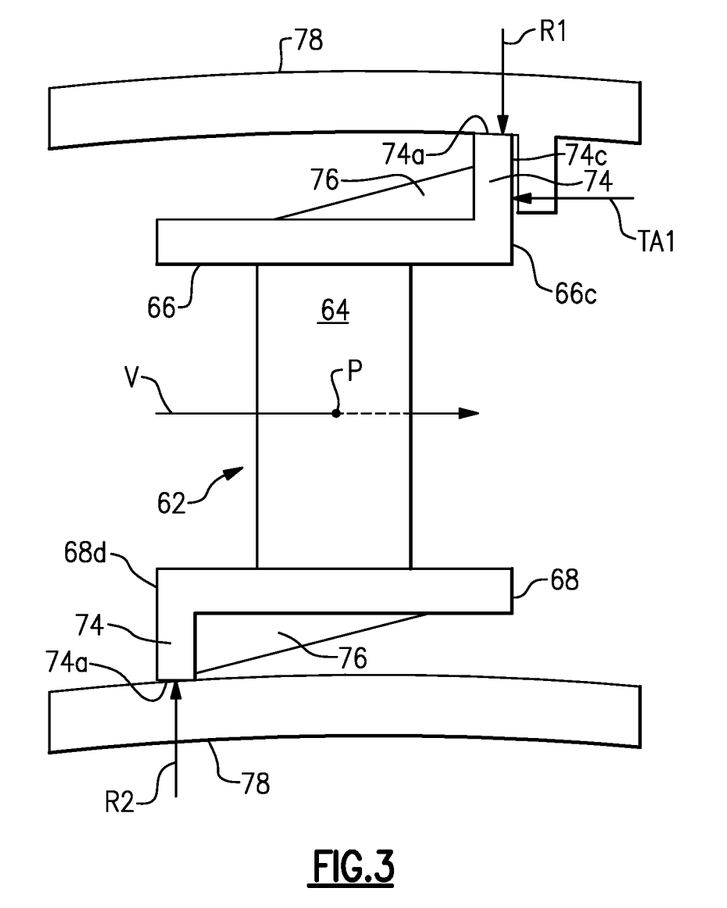
FIG. 3 illustrates a force diagram of an airfoil fairing.

As shown in FIG. 3, the airfoil fairing 62 is supported by support hardware, generally indicated at 78, that interfaces with the flanges 74. The support hardware 78 is not particularly limited, but may include a spar, a support platform, case structures, or the like.

In general, support schemes for mounting structural vane segments formed of CMCs, OMCs, and MMCs are challenging due to lower material stress limits in comparison to high strength superalloys used for some traditional vane segments. For instance, traditional support schemes that utilize hooks or a series of rails can concentrate stresses, create aerodynamic loads, and/or create thermal stresses which may exceed material limits of fiber-reinforced composites. Therefore, even though fiber-reinforced composites may have many potential benefits, such benefits cannot be realized without a suitable support scheme. In this regard, the flanges 74 serve as support features to facilitate a low-stress mounting scheme. The flanges 74 may also serve to stiffen the platforms 66/68.

During operation of the engine 20 combustion gases flow across the airfoil section 64 and gaspath sides 66e/68e of the platforms 66/68. The flow causes aerodynamic loads on the airfoil fairing 62. The aerodynamic loads may be represented by an aerodynamic load vector V through a center of pressure P of the airfoil fairing 62. The vector V is defined by the aerodynamics of the engine 20, including the vane count, mass flow rate, and the turning of the hot gas stream. The turning is a function of the inlet flow angle and the stage reaction, and is independent of the vane camber and/or the chord, for example. The direction of the vector V is defined herein as being orthogonal to the tangent of the aerodynamic turning path of the airfoil fairing 62, and is located at the center of pressure P. Those of ordinary skill in the art will know where this location is and how to determine the vector V, as they will need to determine it during the design process.

The aerodynamic loads are transmitted through the airfoil fairing 62 to the support hardware 78. In this regard, the flanges 74 serve as primary load-bearing features to transmit such loads to the support hardware 78. For example, the radial face 74a of the flange 74 of the platform 66 transmits radial load R1, the tangential/axial face 74c of the flange 74 of platform 66 transmits tangential and axial loads TA1, and the radial face 74a of the flange 74 of the platform 68 transmits radial load R2. In one further example, the radial loads R1/R1 are transmitted only through, or substantially only through, the radial faces 74a, all or substantially all of the tangential load TA1 is transmitted through the tangential/axial face 74c of the flange 74 of the platform 66, and all or substantially all of the axial load is transmitted through the end face 74e of the flange 74 of the platform 66.

The tangential and axial loads above may tend to cause a bending moment on the flange 74 of the platform 66. It is in that regard that the gusset 76 serves to reinforce and stiffen the flange 74 against such loads. Here, the flange 74 of the platform 68 may not bear substantial tangential and axial loads. However, to the extent that such loads exist, the gusset at the platform 68 also serves to reinforce and stiffen the flange 74 of the platform 68. If the tangential and axial loads are minimal, the gusset 76 could be excluded from the platform 68. In the illustrated example, the airfoil fairing 62 transmits the radial, tangential, and axial loads at the suction side circumferential mate face 66c of the platform 66 and at the pressure side circumferential mate face 68d of the platform 68. However, it is to be understood that these locations could vary in other implementations and that the flanges 74 could alternatively be located at the pressure side circumferential mate face 66d of the platform 66 and the suction side circumferential mate face 68c if those are locations at which the loads are borne.

The aerodynamic load vector V intersects the tangential/axial faces 74c of the flanges 74 and, in this example, is orthogonal within +/−15° to the faces 74c. Notably, FIG. 3 is a force diagram representation, but the intersecting relationship is shown in FIG. 2A. The orthogonal relationship between the aerodynamic load vector V and the faces 74c of the flanges 74 facilitates establishing an efficient load path for transmission of the loads from the airfoil fairing 62, which minimizes pressure-driven stresses on the airfoil fairing 62 without imparting a twist on the airfoil section 64. By comparison, a less efficient load path would have twist and, therefore, a longer, less direct load path.

The orthogonal orientation between the vector V and the faces 74c is governed by the angles G of the circumferential mate faces 66c/66d/68c/68d of the platforms 66/68. That is, for a given vector V, the angles G are selected such that the faces 74c are oriented to be orthogonal to the vector V. In general, as indicated above, the angles G will be 15° to 60° relative to the gas turbine engine central axis A.

To enhance reinforcement of the flanges 74, the rib extensions 72b (and the rib 72 generally) are substantially perpendicular to the flanges 74 within +/−15° (i.e., parallel to the load vector V). For example, the center plane of the rib extension 72b is perpendicular to the face 74c. Such an orientation facilitates maximizing the reinforcing effect without having to substantially enlarge the rib extension 72b. For instance, the rib extension height H2 may be approximately equal to the flange height H1 at the intersection, but the rib extension through-thickness T2 may be less than the flange though-thickness T1. The rib extension through-thickness T2 may also be nominally equal to the through-thickness of the rib section 72a such that the rib 72 is of uniform thickness.

Figure 4:
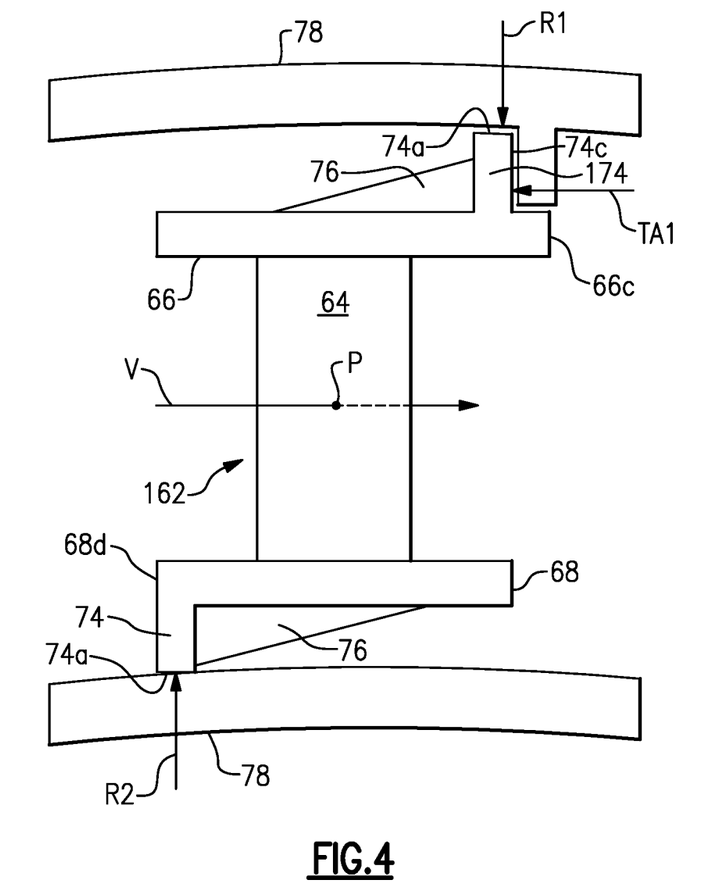
FIG. 4 illustrates another example airfoil fairing with an offset flange.

FIG. 4 illustrates another example of an airfoil fairing 162. The airfoil fairing 162 is the similar to the airfoil fairing 62 except that the flange 174 of the platform 66 is offset from the circumferential mate face 66c such there is a land between the mate face 66c and the flange 174. The flange 174 otherwise functions the same as the flange 74 as described above. The land provides space along the mate face 66c, which may be utilized to accommodate a portion of the support hardware 78 and/or accommodate a seal or seals between the airfoil fairing 162 and the next adjacent airfoil fairing. The flange 174 in the illustrated example runs parallel to the mate face 66c. However, it is to be understood that the orientation of the flange 174 may be varied in accordance with the aerodynamic load vector described above and/or the orientation of the mate face 66c may be varied for performance reasons such that the flange 174 and mate face 66c are non-parallel. Additionally or alternatively, the flange 74 of the platform 68 may be offset in a similar manner from the mate face 68d.

Figure 5:
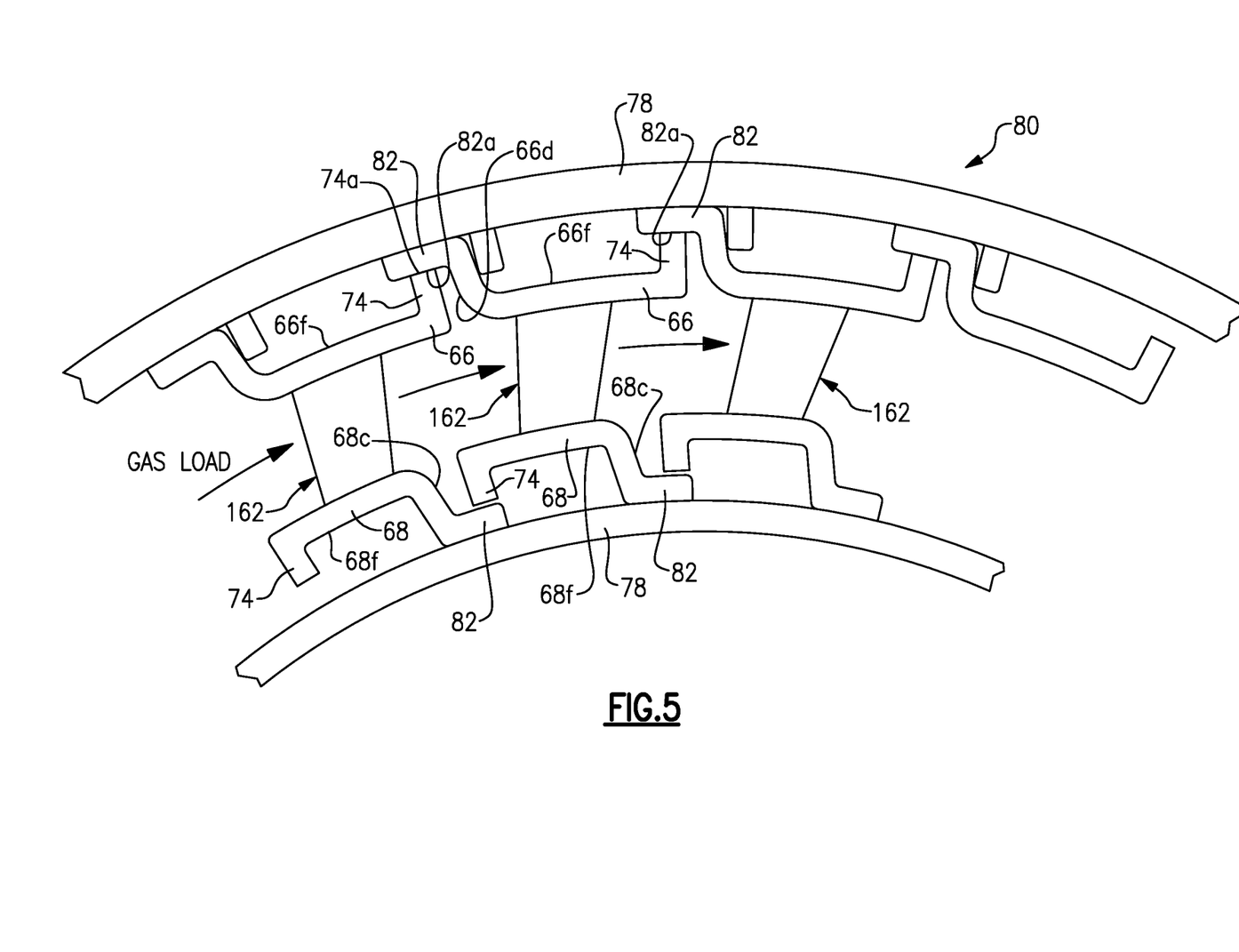
FIG. 5 illustrates an example of a vane system.

FIG. 5 illustrates an example of a vane system 80. In this example, the vane system 80 is comprised of a plurality of airfoil fairings 162 supported by support hardware 78. The airfoil fairings 162 are similar to the airfoil fairings 62 described above but additionally include seal flanges 82 on the platforms 66/68. As shown, both platforms 66/68 include seal flanges 82, but it is to be understood that alternatively only one of the platforms 66 or 68 could have a seal flange 82. The seal flanges 82 project from the non-gaspath sides 66f/68f of the platforms 66/68 opposite the flanges 74. The seal flange 82 of the platform 66 overhangs the pressure side circumferential mate face 66d, and the seal flange 82 of the platform 68 overhangs the suction side circumferential mate face 68c. As used herein, the term "overhangs" or variations thereof refers to the projection of the seal flanges 82 beyond the respective faces 66d/68c. The seal flanges 82 define a radial bearing face 82a.

Under aerodynamic forces, the radial faces 74a of the flanges 74 transmit radial loads. Each radial face 74a bears against the radial bearing face 82a of the seal flange 82 of the adjacent airfoil fairing 162. This interaction provides a seal between adjacent airfoil fairings 62, which serves to keep hot gases in the core gaspath from entering the regions radially inward and outwards of the platforms 66/68. The airfoil fairings 162 may include the gussets 76 as discussed above, however, if the loads borne at the flanges 74 are relatively low, the gussets 76 may alternatively be excluded.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vane arc segment comprising:
    an airfoil fairing having first and second fairing platforms and an airfoil section extending therebetween, the airfoil section having a pressure side, a suction side, and an internal cavity,
    the first fairing platform defining suction and pressure side circumferential mate faces, forward and aft faces, a gaspath side, a non-gaspath side, and a flange projecting from the non-gaspath side,
    the flange extending along the suction side circumferential mate face, and
    a rib having a rib section in the internal cavity spanning the pressure side and the suction side and a rib extension section extending from the rib section in the internal cavity and along the non-gaspath side of the first fairing platform, the rib extension intersecting the flange to form a gusset for reinforcing the flange, the rib extension terminating at a fillet between the pressure side of the airfoil section and the first fairing platform.

2. The vane arc segment as recited in claim 1, wherein the rib extension is substantially perpendicular to the flange.

3. The vane arc segment as recited in claim 1, wherein, relative to the non-gaspath side, the rib extension defines a rib extension height, the flange defines a flange height, and the flange height is approximately equal to the rib extension height.

4. The vane arc segment as recited in claim 1, wherein the rib extension defines a rib extension through-thickness, the flange defines a flange through-thickness, and the rib extension through-thickness is less than the flange through-thickness.

5. The vane arc segment as recited in claim 1, wherein the first fairing platform includes a seal flange that projects from the non-gaspath side and overhangs the pressure side circumferential mate face.

6. The vane arc segment as recited in claim 5, wherein the seal flange includes a radial bearing face.

7. The vane arc segment as recited in claim 1, wherein the airfoil fairing is arranged about a gas turbine engine central axis, and the suction and pressure side circumferential mate faces form angles of 15° to 60° relative to the gas turbine engine central axis.

8. The vane arc segment as recited in claim 1, wherein the airfoil fairing is formed of a ceramic matrix composite that has a plurality of fiber plies that are continuous through the flange and first fairing platform, the airfoil section, and the second fairing platform.

9. The vane arc segment as recited in claim 8, wherein the flange bears radial, tangential, and axial aerodynamic load transmissions of the airfoil fairing.

10. The vane arc segment as recited in claim 1, wherein the flange is flush with the one of the suction or pressure side circumferential mate faces along which the flange extends.

11. The vane arc segment as recited in claim 1, wherein the flange is offset from the suction side circumferential mate face.

12. The vane arc segment as recited in claim 1, wherein the airfoil fairing is arranged about a gas turbine engine central axis, the flange includes a radial face that has a curved profile, and the curved profile is a cylindrical surface segment of a reference cylinder having a main axis that is co-linear with the gas turbine engine central axis.

13. A gas turbine engine comprising:
    a compressor section;
    a combustor in fluid communication with the compressor section; and
    a turbine section in fluid communication with the combustor, the turbine section having vane arc segments disposed about a central axis of the gas turbine engine, each of the vane arc segments includes:
        an airfoil fairing having first and second fairing platforms and an airfoil section extending therebetween, the airfoil section having a pressure side, a suction side, and an internal cavity,
        the first fairing platform defining suction and pressure side circumferential mate faces, forward and aft faces, a gaspath side, a non-gaspath side, and a flange projecting from the non-gaspath side,
        the flange extending along the suction side circumferential mate face, and
        a rib having a rib section in the internal cavity spanning the pressure side and the suction side and a rib extension section extending from the rib section in the internal cavity and along the non-gaspath side of the first fairing platform, the rib extension intersecting the flange to form a gusset for reinforcing the flange, the rib extension terminating at a fillet between the pressure side of the airfoil section and the first fairing platform.

14. The gas turbine engine as recited in claim 13, wherein the first fairing platform includes a seal flange that projects from the non-gaspath side and overhangs the pressure side circumferential mate face.

15. The gas turbine engine as recited in claim 14, wherein the flange projecting from the non-gaspath side includes a radial flange face and the seal flange includes a radial bearing face, and the radial flange face of a first one of the vane arc segments seals against the radial bearing face of a second, adjacent one of the vane arc segments.

16. A vane system comprising:
a plurality of vane arc segments, each said vane arc segment including,
   an airfoil fairing having first and second fairing platforms and an airfoil section extending therebetween, the airfoil section having a pressure side and a suction side,
   the first fairing platform defining suction and pressure side circumferential mate faces, forward and aft faces, a gaspath side, a non-gaspath side, and a first flange projecting from the non-gaspath side,
   the first flange extending along the suction side circumferential mate face and including a radial flange face,
   a second flange that projects from the non-gaspath side and overhangs the pressure side circumferential mate face, the second flange including a radial bearing face,
   wherein and the radial flange face of a first one of the vane arc segments seals against the radial bearing face of a second, adjacent one of the vane arc segments, and
   the airfoil section defining an internal cavity and including a rib that has a rib section in the internal cavity spanning the pressure side and the suction side and a rib extension section that extends from the rib section in the internal cavity and along the non-gaspath side of the first fairing platform, the rib extension intersecting the first flange to form a gusset for reinforcing the first flange, and the rib extension terminating at a fillet between the pressure side of the airfoil section and the first fairing platform.

17. The vane system as recited in claim 16, wherein the rib extension defines a rib extension through-thickness, the first flange defines a flange through-thickness, and the flange through-thickness is greater than the rib extension through-thickness.

* * * * *